Figure 6:
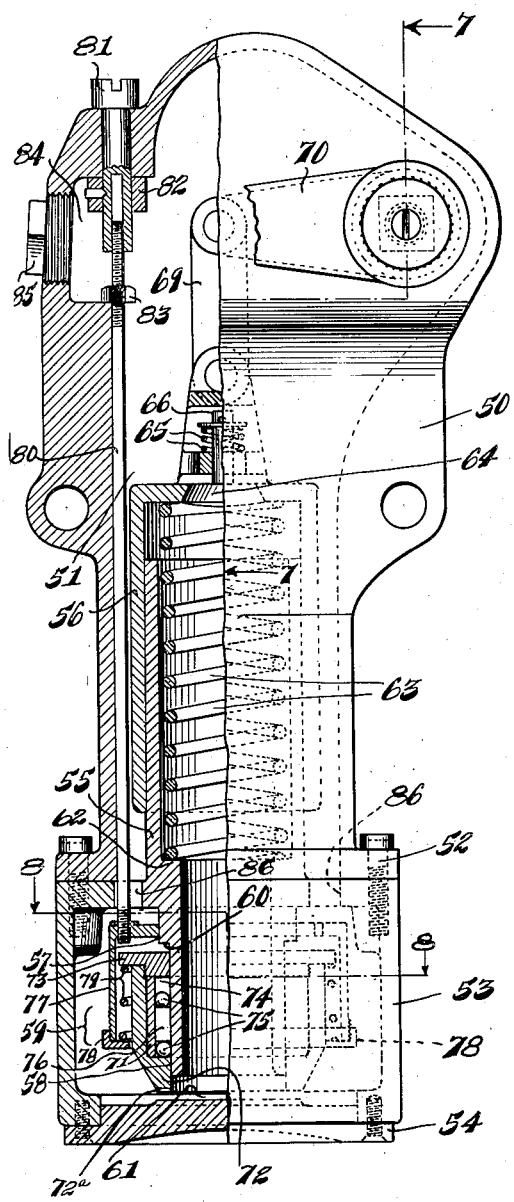

Dec. 11, 1928.
W. J. PAVEK
1,694,949
SHOCK ABSORBER
Filed Dec. 20, 1926    2 Sheets-Sheet 1
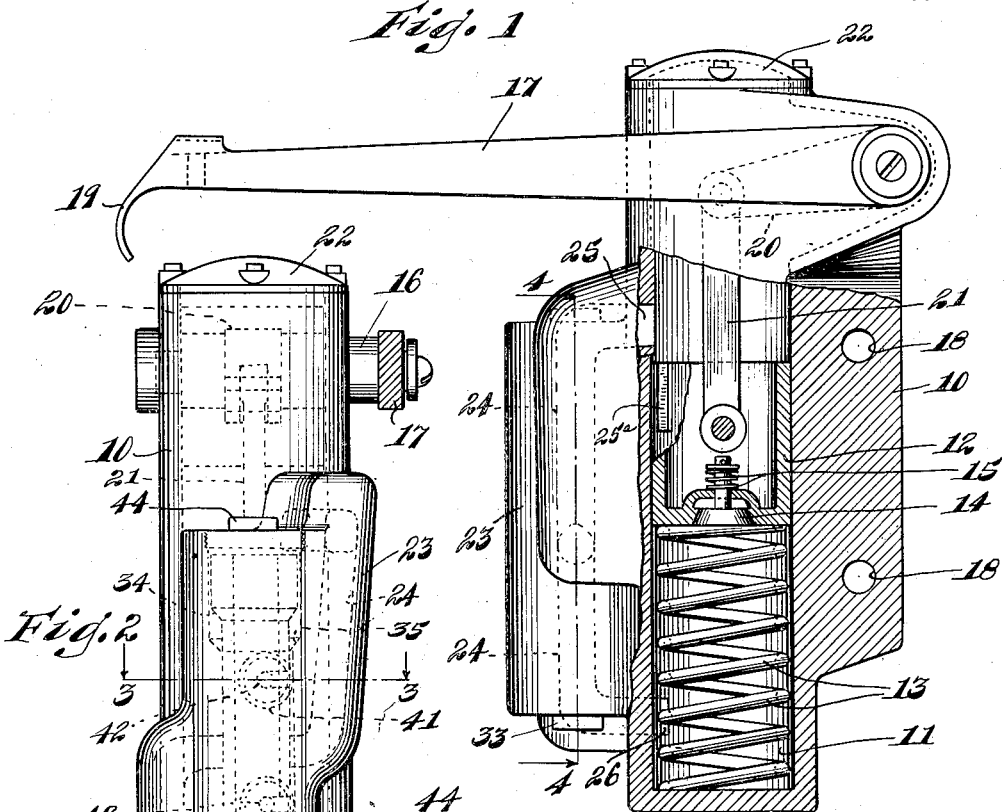
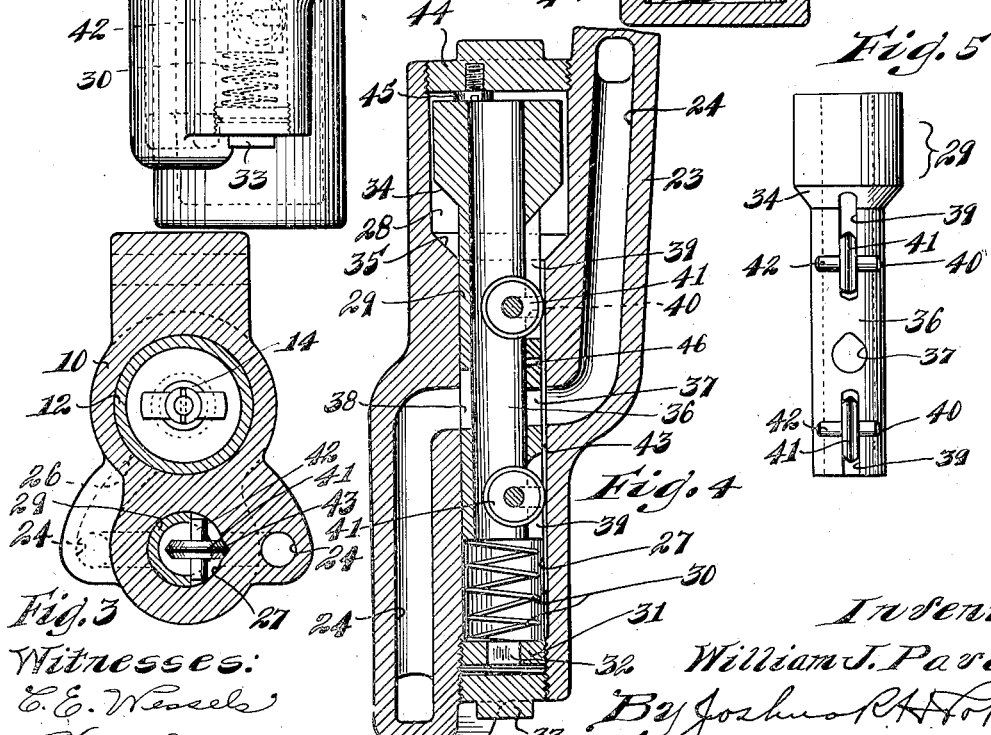
Inventor:
William J. Pavek,
By Joshua R H Potts
his Attorney.

Dec. 11, 1928.

W. J. PAVEK 1,694,949

SHOCK ABSORBER

Filed Dec. 20, 1926  2 Sheets-Sheet 2

Witnesses:
E. E. Wessels
Wieluff Muniel

Inventor:
William J. Pavek,
By Joshua R. H. Potts
his Attorney.

Patented Dec. 11, 1928.

1,694,949

UNITED STATES PATENT OFFICE.

WILLIAM J. PAVEK, OF CICERO, ILLINOIS.

SHOCK ABSORBER.

Application filed December 20, 1926. Serial No. 155,791.

My invention relates to shock absorbers such as are used on motor vehicles to off- set the recoil of the springs and more particularly to the hydraulic type.

The present shock absorbers, both of the hydraulic and of the snubber type, are so designed that their reaction against the recoil of the spring is dependent on, or governerened only, by the degree of deflection of the springs, or the rate of extension of the springs, and the amount of reaction is in a fixed relation to these factors, regardless of whether the extension of the spring is caused by a portion of the wheel and axle in passing over irregularities in the roadway, or by a motion of the car body, caused by the impulses received from recoils of the springs.

Obviously, if the extension of a spring is checked in a moment when the axle is moving downward and the car body is tending to move only horizontally, the holding or checking of the spring's extension result in a drop and a subsequent check of the drop of the vehicle. These up and down movements defeat, to a certain extend, the purpose of a shock absorber and its operation in providing for a relatively smooth horizontal motion of the vehicle.

The principal object in my invention is to equip a hydraulic shock absorber with a throttle valve, which is actuated, due to its own inertia, by up or down movements of the vehicle body, and not by any relative movement of the axle to the car body. This valve is, therefore, selective in its operation and causes throttling of the moving fluid, and, therefore, a reaction to the recoil of the spring, in only those instances when the recoil is moving the car body upward.

This throttle valve is returned to its normal or non-throttling position, either rather slowly by a weak spring, or more rapidly, due to the inertia of the valve, in cases when the car body starts to move downward.

The valve design may, furthermore, be such that its movements and the throttling of the fluid will take place only to a degree which is necessary to prevent jerks or movements of the vehicle body under the varying conditions in the character of the irregularities in the roadway and variations in the speed of the vehicle.

These and other various objects and advantages will be more readily understood from the following description and from the accompanying drawings in which Fig. 1 is a side view, partly in section, of an embodiment of my invention.

Fig. 2, a view of the device shown in Fig. 1, looking from the left,

Fig. 3, a section on line 3—3 of Fig. 2,

Fig. 4, an enlarged section on line 4—4 on Fig. 1, and

Fig. 5, an elevation of the inertia operated valve member, looking from the right of Fig. 4.

Figure 7:
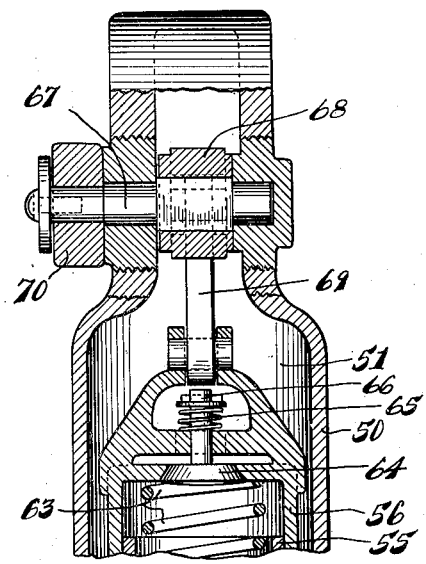
Figure 8:
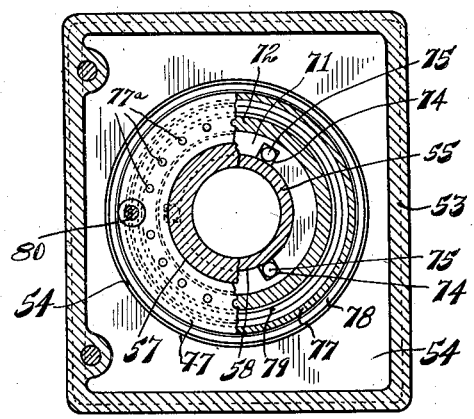

Fig. 6, is a side view, partly in section and partly in elevation, of another embodiment of my invention, Fig. 7 is a section taken on line 7—7 on Fig. 6, and Fig. 8, a section taken on line 8—8 on Fig. 6.

Referring now more particularly to Figures 1 to 5, the device consists of a casing 10 having a central bore or cylinder 11 in which a piston 12 is mounted for vertical reciprocation. A spring 13 is contained in the lower end of cylinder 11 and tends to move piston 12 upwardly. The lower end of piston 12 is provided with a one way valve 14 which is normally held in closed position by a spring 15 encircling the valve stem as plainly shown in Fig. 1. A shaft 16 is rockably mounted in the upper end of casing 10 and has an arm 17 secured to one of its ends and extending normally at right angles to the body of the casing. Casing 10 is provided with a plurality of holes 18, by means of which it may be secured to the frame or body of a vehicle, and arm 17 is provided on its outer end with a connection 19 to which one end of a strap or cable may be secured, the other end of which may be secured to the axle or spring of the vehicle.

An arm 20 is fixed to shaft 16 near its center and has a piston rod 21 mounted on its outer end; the other end of the piston rod being connected to piston 12. It is evident that movement of arm 17 relatively to casing 10, will cause piston 12 to reciprocate in cylinder 11. Access is had to the interior of casing 10 through the open upper end, which is closed by a cap 22 secured to the casing by suitable bolts.

An extension 23 is formed on casing 10 and is provided with a passageway 24, the upper end of which communicates with cylinder 11 through port 25 and its lower end communicates with lower end of cylinder 11 through port 26. Extension 23 has a central bore 27, the upper end of which is enlarged as shown at 28. Valve member 29 is slidably mounted in bore 27 and held in its uppermost position by a coiled spring 30 disposed between the lower end of the valve member and adjusting nut 31 threaded into the lower end of bore 27. Nut 31 is provided with a square aperture 32 through its center by means of which it may be raised or lowered to increase or decrease the tension on spring 30. The lower end of bore 27 is closed by a plug 33 threaded into the bore immediately below nut 31. The upper end of valve member 29 is enlarged so as to form shoulders 34 which are adapted to abut shoulders 35 and thus prevent the valve member from moving downwardly beyond this point.

Valve member 29 is provided with a longitudinal bore 36 and ports 37 and 38, formed through its side walls, are adapted to register with passageway 24 when the valve member is in its uppermost position.

Two slots 39 are formed in one face of valve member 29 and a groove 40 bisects these slots at right angles thereto. Two rollers 41, having V-shaped faces, are inserted in slots 39 and rotatably held therein by means of their axles 42 being disposed in grooves 40, as plainly shown in Figures 3, 4 and 5. A guideway 43 is formed longitudinally in one wall of bore 27 and is adapted to engage the beveled faces of rollers 41. With this arrangement, rollers 41 provide a rolling contact with the wall of the bore and prevent valve member 29 from sticking during reciprocation and the beveled faces of the rollers engaging the guideway, prevent valve member 29 from rotating, thus assuring that ports 37 and 38 will remain in register with passageway 24 when the valve member is in its uppermost position.

The upper end of bore 27 is closed by a plug 44 threaded therein and has a screw 45 threaded into its lower face by means of which the extreme upward position of valve member 29 may be fixed.

Assuming that casing 10 is secured to the body of a motor vehicle and that a flexible member connects arm 17 with the axle of the vehicle, upward movement of the axle would raise arm 17 and allow spring 13 to raise piston 12 high enough to eliminate any slack in the flexible connecting member. As these devices are normally filled with oil when in operation, upward movement of piston 12 may cause valve 14 to open and allow the liquid above the piston to flow into the cylinder below the piston. When the vehicle axle reaches the top of its upward movement spring 15 would close valve 14 and, as soon as the vehicle springs started to recoil and force piston 12 downwardly. oil pressure on the under side of valve 14 would assist in holding this valve in closed position so that the oil would be forced to return to the upper side of the piston by way of passage-way 24 and port 25, during which movement it must flow through valve member 29 by way of ports 37 and 38. During the upward movement of the piston the oil may actually return to the under side of the piston by flowing through passageway 24 and ports 37 and 38, if these ports are not depressed so as to close the passage, as well as through the valve 14 as already explained.

In case the wheels of the vehicle have struck an elevation in the roadway, the springs are compressed beyond their normal position and start their recoil which causes casing 10 to move upwardly faster than valve member 29, which is only supported in its upper position by the weak spring 30, and consequently it moves downward relative to the casing and partially closes ports 37 and 38, thus, impeding the movement of oil through passageway 24.

In the device illustrated, valve member 29 can move downwardly until the passageway is entirely closed by the side wall above port 37 and the port 38 partially closed by the side wall above the port. In order that there will not be a stoppage of the oil passage 24 when the piston 12 is in its uppermost position I provide a slot or port 25$^a$ in its side which registers over the port 25. Also, I provide a plurality of small bleeder holes 46 through the side wall of valve member 29 immediately above port 37. In this manner, the sudden start of the recoil is checked momentarily or until spring 30 can restore valve member 29 to its original position when the oil may flow through the ports and passageway and gradually allow the vehicle spring to return to its normal position.

Referring now to Figures 6, 7, and 8, which show a different embodiment of my invention, 50 represents the main casing having a liquid compartment 51 and an open bottom 52. An auxiliary casing 53 is bolted to the bottom 52 and has its lower end closed by means of a cap 54. A hollow cylinder 55 is secured to, or cast integral with, the top of auxiliary casing 53 and extends upwardly into compartment 51; the outer wall being finished to provide a sliding contact with a hollow piston 56. Hollow cylinder 55 extends downwardly into auxiliary casing 53 and, immediately below the top of the auxiliary casing, it has its exterior finished to provide a seat 57 which is of smaller diameter than the upper part of the cylinder. Immediately below seat 57, the cylinder is finished with a still smaller diameter to provide a seat 58 for an inertia operated valve 59; the junction of seats 57 and 58 forming a shoulder 60 which limits the upward movement of valve 59. The lower end of cylinder 55 approaches bottom 54 leaving a narrow fluid passage 61 therebetween.

The portion of cylinder 55 which extends into auxiliary casing 53 is of smaller internal diameter than the portion extending upwardly into casing 50, thus forming a shoulder 62 against which the lower end of coiled spring 63 bears  The upper end of spring 63 bears aga'nst the top of piston 56 and tends to move same upwardly.

One way valve 64 is mounted in the top of piston 56 and has a coiled spring 65 encircling its stem 66 so that the valve is normally held in closed position.

A shaft 67 is rockably mounted in casing 50 and has an arm 68 fixed near its central portion and extending toward the center of the casing where it is operatively connected to piston 56 by means of piston rod 69. An external arm 70 is fixed to shaft 67 and is adapted to be connected to a relatively movable body, such as the axle or spring of a motor vehicle when the casing is connected to its frame or body. It will be evident that movement of arm 70, relatively to casing 50, will reciprocate piston 56 on cylinder 55.

Valve 59 consists of a ring 71, the inner surface of which engages the outer surface of seat 58 on cylinder 55; a sleeve 72 is bored to fit slidably on seat 58 and is counterbored to receive ring 71, as plainly shown in Figure 6. A collar 73 is threaded to sleeve 72 and is adapted to hold ring 71 therein and is bored to also sildably fit seat 58. In order that valve 59 will not tend to stick on seat 58, vertical grooves 74 are formed in ring 71, each of which contains two hardened steel balls 75 which are separated from one another by a spacer 76. Any number of these rolling contacts may be employed, but I find three to be satisfactory and have shown the device as being equipped with this number.

In order that valve 59 may be normally held out of engagement with bottom 54, a cage 77 is slidably mounted on seat 57 with its flange extending downwardly and surrounding valve 59. A r'ng 78 is threaded onto the lower edge of cage 77 and supports the bottom end of a spring 79 which encircles valve 59 with its upper end abutting the under edge of collar 73 and thus yieldingly holds valve 59 against downward movement. Upward movement of valve 59 is limited by shoulder 60 which is adapted to abut collar 73, should the valve be raised to this point. The cage 77 also shields the valve 59 so its proper operation will not be interfered with by the violent currents of oil through passage 61 and the space between the outer wall of casing 53 and the valve.

The normal tension of spring 79 is regulated by means of a rod 80 threaded into cage 77 and extending upwardly through compartment 51 to the top of casing 50 where it is threaded into an internally threaded screw 81. A collar 82 encircles screw 81, on the inside of casing 50, and is held in place by a suitable set screw so that screw 80 may be rotated but is held against longitudinal movement. A nut 83 is threaded on the upper end of rod 80 and is adapted to abut a shoulder, formed by inlet 84, and may be adjusted to limit the downward movement of rod 80. Oil or other liquid is introduced into casing 50 through inlet 84, wh'ch is normally closed by a pipe plug 85.

Assuming that casing 50 is filled with oil and is attached to the body of a motor vehicle and that arm 70 is attached to the axle of the vehicle, the device would operate in the following manner. When the vehicle springs are depressed, due to the wheels striking an obstruction or depression, it is evident that the end of arm 70 will move upwardly and allow spring 63 to raise piston 56, which movement will cause valve 64 to open and liquid from above piston 56 to flow into the piston in addition to such amounts of oil as may flow in through passage 61. As the springs reach the limit of depression and start to recoil, arm 70 will start to depress piston 56 which will force oil from the interior of piston 56 and cylinder 55 through fluid passage 61 and up through a series of small holes 86 formed in the top of auxiliary casing 63. If the recoil of the spring is very slight, intertia operated valve 59 will not operate and the vehicle spring may be extended without encountering appreciable reaction.

Should the recoil be more sudden or violent, casing 50 will move upwardly faster than spring 79 can move valve 59, with the result that valve 59 is lowered and closes either entirely or partly, the fluid passage 61 for the period of time necessary for spring 79 to overcome the inertia and raise valve 59. The amount of depression of valve 59 and the period in which it is restored to normal will, of course, depend on the size and character of the irregularities in the roadway and the speed of the vehicle, or in other words the time required to pass over them, in order to prevent an absolute stoppage of the flow of oil and, thereby, prevent a solid stopping of the arm 70 when the passage 61 is entirely closed, I provide a small bleeder hole 72$^a$ through the sleeve 72.

In order to permit freedom of movement of valve 59 within the cage 77, a series of breather holes 77$^a$ are provided at the top of the cage, allowing oil to pass in and out and, thereby, eliminating the generation of pressure or suction as the valve moves up and down in the cage which would oppose its motion and make it less effective in varying the opening through passage 61, according to the requirements.

While I have illustrated and described two embodiments of my invention it will be readily understood that various modifications might be made without departing from the spirit thereof and hence I do not wish to limit myself to the precise construction set forth but consider that I am at liberty to make such changes and alterations as fairly come within the scope of the appended claims.

Having thus described my invention, what I claim as new and desire to protect by Letters Patent is—

1. In a shock absorber having a casing containing liquid, a piston in the casing adapted to displace the liquid and means to allow movement of the liquid when so displaced; an inertia operated valve associated with said means whereby upward movement of the casing will cause said valve to retard the return movement of the displaced oil and rollers on the valve to insure ease of movement.

2. In a shock absorber having a casing containing liquid, a piston in the casing adapted to displace the liquid and means to allow movement of the liquid when so displaced; an inertia operated valve associated with said means whereby upward movement of the casing will cause said valve to retard the return movement of the displaced oil, rollers on the valve to prevent same from sticking, and means to yieldingly hold the valve in open position.

3. In a shock absorber having a casing containing liquid, a piston in the casing adapted to displace the liquid and means to allow movement of the liquid when so displaced; an inertia operated valve associated with said means whereby upward movement of the casing will cause said valve to retard the return movement of the displaced oil, means to prevent the valve from rotating, and means to yieldingly hold the valve in open position.

4. A shock absorber including a casing having a cylinder formed therein, a shaft rockable in the casing, a piston in the cylinder operatively connected to the shaft, the casing having a fluid passage communicating with the cylinder above and below the piston, a valve in the piston, a spring adapted to move the piston upwardly, an arm on the shaft adapted to actuate the piston, and an inertia operated valve adapted to partially obstruct the fluid passage when the casing is moved upwards.

5. A shock absorber including a casing having a cylinder formed therein, a shaft rockable in the casing, a piston in the cylinder operatively connected to the shaft, the casing having a fluid passage communicating with the cylinder above and below the piston, a valve in the piston, a spring adapted to move the piston upwardly, an arm on the shaft adapted to actuate the piston, an inertia operated valve adapted to partially obstruct the fluid passage when the casing is moved upwards, and means to adjust the movement of the inertia operated valve.

6. A shock absorber including a casing having a cylinder formed therein, a shaft rockable in the casing, a piston in the cylinder operatively connected to the shaft, the casing having a fluid passage communicating with the cylinder above and below the piston, a valve in the piston, a spring adapted to move the piston upwardly, an arm on the shaft adapted to actuate the piston, an inertia operated valve adapted to partially obstruct the fluid passage when the casing is moved upwards, and means to prevent rotation of the inertia operated valve.

7. A shock absorber including a casing having a cylinder formed therein a shaft rockable in the casing, a piston in the cylinder operatively connected to the shaft, the casing having a fluid passage communicating with the cylinder above and below the piston, a valve in the piston, a spring adapted to move the piston upwardly, an arm on the shaft adapted to actuate the piston, an inertia operated valve adapted to partially obstruct the fluid passage when the casing is moved upwards, and roller means for preventing the inertia operated valve from sticking.

8. A shock absorber including a casing having a cylinder formed therein, a shaft rockable in the casing, a piston in the cylinder operatively connected to the shaft, the casing having a fluid passage communicating with the cylinder above and below the piston, a valve in the piston, a spring adapted to move the piston upwardly, an arm on the shaft adapted to actuate the piston, an inertia operated valve adapted to partially obstruct the fluid passage when the casing is moved violently upwards, means for yieldingly holding the inertia operated valve in its upper position, and bevel faced rollers let into said valve and engaging a groove in the casing whereby said valve is prevented from rotating or sticking.

9. In a shock absorber of the class described having a cylinder and an upper and a lower port leading therefrom, an inertia operated valve including a valve casing having a fluid passage communicating with said ports and a valve chamber bisecting said passage; a valve member, having ports adapted to register with the fluid passage, slidable in the valve chamber; means to prevent the valve from rotating or sticking, and a spring adapted to yieldingly hold the valve in its uppermost position.

10. In a shock absorber of the class described having a cylinder and a by-pass leading from its upper to its lower portions, an inertia operated valve including a casing having a valve chamber formed therein and intersecting said by-pass, a vertical guideway formed in said valve chamber, a valve member slidable in said chamber and having ports adapted to register with said by-pass, the valve member having vertical slots formed in its side wall and a transverse groove intersecting each slot, a roller in each slot having an axle mounted in the transverse groove, a beveled face on each roller engaging the guideway whereby the valve member is prevented from rotating or sticking, and means to yieldingly hold the valve member in its uppermost position.

11. A shock absorber comprising a casing or cylinder containing a fluid, a piston reciprocally mounted in the cylinder, a rock shaft with an external and internal arm for operating the piston, a relatively narrow bypass for the fluid from the bottom to the top of the cylinder with means on the bypass for retarding the flow in one direction and adapted to allow the fluid to flow freely in the other direction, and means to prevent the first said means from rotating or sticking.

12. A shock absorber for cushioning movements of one of two relatively moving members, comprising a casing, containing a fluid, adapted to be secured to one of the said members; means within the said casing adapted to be operatively connected to the other relatively movable member; said means being adapted to cause the fluid to flow through a passage; and means adapted to restrict the flow of the fluid, when the first mentioned movable member moves upward and to allow free flow of the fluid when the other relatively movable member moves downward, the last said means having rollers thereon to insure ease of movement thereof.

13. A shock absorber adapted to be attached to the axle and the body of a vehicle, said body and axle being relatively movable, and having inertia means adapted to cause restraint of the relatively upward movement of the body and adapted to permit without restraint the relative up and down movement of the axle, and rollers arranged on said means to prevent the same from sticking.

14. A hydraulic shock absorber adapted to be operatively secured to two relatively movable members and having inertia means adapted to restrain the upward movement of one member and adapted to allow unrestrained all other movements of the two members, and means to prevent rotation of the first said means.

15. A selected shock absorber adapted to cushion the movements between two relatively movable members, having means adapted to allow without restraint absolute movement of one member and restrain absolute movement of the other member to the extent that said absolute movement causes relative movement of the two members, inertia means therein having rollers thereon to prevent sticking or rotation of said inertia means.

16. A selective shock absorber adapted to restrain the relative movements, of two members, which consists of absolute movements of one of the members, and to allow free and unrestrained relative movements which consist of absolute movements of the other member, inertia means therein having rollers thereon for preventing sticking and insuring ease of operation of said inertia means.

17. A selective shock absorber adapted to restrain the relative movements of two members to the extent that said relative movements consist of absolute movements of one member and allow unrestrained relative movements to the extent that said movements consist of absolute movements of the other member, inertia means therefor, provided with means to prevent rotation of said inertia means.

In testimony whereof I have signed my name to this specification.

WILLIAM J. PAVEK.